(12) United States Patent
Urban et al.

(10) Patent No.: US 11,025,875 B2
(45) Date of Patent: Jun. 1, 2021

(54) METHOD FOR COLOR MAPPING A VIDEO SIGNAL AND METHOD OF ENCODING A VIDEO SIGNAL AND CORRESPONDING DEVICES

(71) Applicant: InterDigital VC Holdings, Inc., Wilmington, DE (US)

(72) Inventors: Fabrice Urban, Thorigne Fouillard (FR); Philippe Bordes, Laille (FR); Marie-Jean Colaitis, Cesson-Sévigné (FR); Pierre Andrivon, Liffre (FR)

(73) Assignee: InterDigital VC Holdings, Inc., Wilmington, DE (US)

( * ) Notice: Subject to any disclaimer, the term of this patent is extended or adjusted under 35 U.S.C. 154(b) by 0 days.

(21) Appl. No.: 15/572,894

(22) PCT Filed: May 11, 2016

(86) PCT No.: PCT/EP2016/060503
§ 371 (c)(1),
(2) Date: Nov. 9, 2017

(87) PCT Pub. No.: WO2016/188742
PCT Pub. Date: Dec. 1, 2016

(65) Prior Publication Data
US 2018/0160088 A1    Jun. 7, 2018

(30) Foreign Application Priority Data

May 22, 2015   (EP) ..................... 15305781

(51) Int. Cl.
*G06T 1/20*    (2006.01)
*H04N 9/67*    (2006.01)
(Continued)

(52) U.S. Cl.
CPC ............. *H04N 9/67* (2013.01); *H04N 1/6058* (2013.01); *H04N 9/68* (2013.01); *H04N 19/186* (2014.11);
(Continued)

(58) Field of Classification Search
CPC ....................................................... G06T 1/20
(Continued)

(56) References Cited

U.S. PATENT DOCUMENTS

| 7,692,666 B1 | 4/2010 | Bourgoin et al. |
| 2005/0024363 A1* | 2/2005 | Estrop .................... G09G 5/363 345/501 |
| 2009/0167955 A1 | 7/2009 | Pettitt et al. |

FOREIGN PATENT DOCUMENTS

| CN | 101026777 A | 8/2007 |
| CN | 101335894 A | 12/2008 |

(Continued)

OTHER PUBLICATIONS

Anonymous, "Studio Encoding Parameters of Digital Television for Standard 4:3 and Wide-Screen 16:9 Aspect Ratios", Recommendation ITU-R BT.601-5, International Telecommunications Union, Section 11B: Digital Television, Oct. 1995, pp. 1-16.

(Continued)

*Primary Examiner* — John W Miller
*Assistant Examiner* — Sihar A Karwan
(74) *Attorney, Agent, or Firm* — Xiaoan Lu (57) ABSTRACT

A method for color mapping a video signal into a mapped video signal responsive to at least one color mapping function is disclosed. To this aim, at least one black point offset is determined responsive to a color encoding system of the video signal and to a color encoding system of the mapped video signal. The at least one black point offset and the at least one color mapping function are then applied on the video signal to obtain the mapped video signal.

14 Claims, 6 Drawing Sheets

(51) Int. Cl.
*H04N 19/463* (2014.01)
*H04N 1/60* (2006.01)
*H04N 9/68* (2006.01)
*H04N 19/186* (2014.01)
*H04N 19/70* (2014.01)
H04N 19/52 (2014.01)
H04N 11/20 (2006.01)

(52) U.S. Cl.
CPC .......... *H04N 19/463* (2014.11); *H04N 19/70* (2014.11); *H04N 11/20* (2013.01); *H04N 19/52* (2014.11)

(58) Field of Classification Search
USPC ........................................................ 345/501
See application file for complete search history.

(56) References Cited

FOREIGN PATENT DOCUMENTS

| WO | WO2015007599 | 1/2015 |
|---|---|---|
| WO | WO2015052935 A1 | 4/2015 |
| WO | WO2015144566 | 10/2015 |
| WO | WO2016058835 | 4/2016 |

OTHER PUBLICATIONS

Anonymous, "Parameter values for the HDTV standards for production and international program exchange", Recommendation ITU-R BT.709-5, International Telecommunications Union, BT Series, Broadcasting service (television), Apr. 2002, pp. 1-32.

Anonymous, "Parameter values for ultra-high definition television systems for production and international program exchange", Recommendation ITU-R BT.2020, International Telecommunications Union, BT Series, Broadcasting service (television), Aug. 2012, pp. 1-7.

Anonymous, "Reference software for ITU-T H.265 high efficiency video coding", Telecommunication Standardization Sector of International Telecommunications Union, ITU-T H265.2, Series H: Audiovisual and Multimedia Systems, Infrastructure of audiovisual services—Coding of moving video, Oct. 2014, pp. 1-12.

Anonymous, "Dynamic Metadata for Color Volume Transform—Core Components", Society for Motion Picture and Television Engineers, SMPTE Standard, SMPTE ST 2094-1:2016, May 18, 2016, pp. 1-15.

Joshi et al., "High Efficiency Video Coding (HEVC) Screen Content Coding: Draft 3", Joint Collaborative Team on Video Coding (JCT-VC) of ITU-T SG 16 WP 3 and ISO/IEC JTC 1/SC 29/WG 11, 20th Meeting, Geneva, Switzerland, Feb. 10, 2015, pp. 1-565.

\* cited by examiner

METHOD FOR COLOR MAPPING A VIDEO SIGNAL AND METHOD OF ENCODING A VIDEO SIGNAL AND CORRESPONDING DEVICES

This application claims the benefit, under 35 U.S.C. § 365 of International Application PCT/EP2016/060503, filed May 11, 2016, which was published in accordance with PCT Article 21(2) on Dec. 1, 2016, in English, and which claims the benefit of European Patent Application No. 15305781.5, filed May 22, 2015.

1. TECHNICAL FIELD

In the following, a method of color mapping a video signal and a corresponding device are disclosed. A method of encoding a video signal and color mapping data is disclosed. A corresponding encoding device is further disclosed.

2. BACKGROUND ART

Color mapping data are data accompanying pictures or video signal and providing information to help map the colors of these pictures or video signal into another color space or color volume. A color volume is specified by color primaries and reference white and further by a dynamic range (i.e. min/max luminance peaks). Color mapping data may be created to enable to color map a version of a video signal created for Blu-Ray into a version of the same video signal for DVD. The color mapping data are usually determined in studio or authoring facilities, i.e. on the production side, from RGB 4:4:4 or YUV 4:2:0 video signals.

Figure 1:
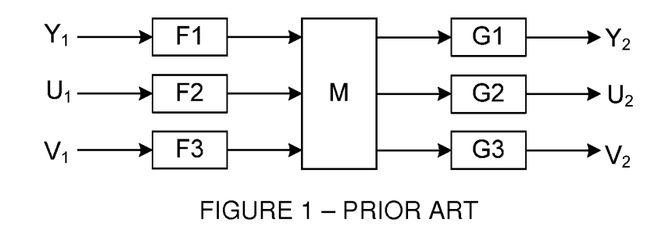
FIG. 1 illustrates the color mapping of a video signal (Y1, U1, V1) into a mapped video signal (Y1, U1, V1) according to the prior art.

An example of such color mapping data (aka color remapping information) is defined in sections D.2.32 and D.3.32 of the document ISO/IEC 23008-2:2015 (also known as MPEG-H part 2, ITU-T H.265 or HEVC). In this document, the color mapping data are indicated in a SEI message (SEI is the English acronym of "Supplemental Enhancement Information") named colour_remapping_info SEI message (hereinafter referred to as CRI). The color mapping data defines a color mapping function CMF. In the CRI, the color mapping function is defined as a composition of one-dimensional mapping functions (F1, F2, F3, G1, G2, G3) defined per color component and a 3×3 matrix (M) as depicted on FIG. 1. Each one-dimensional mapping function is implemented using a 1D LUT (i.e. a one-dimensional Look-Up Table).

Figure 2:
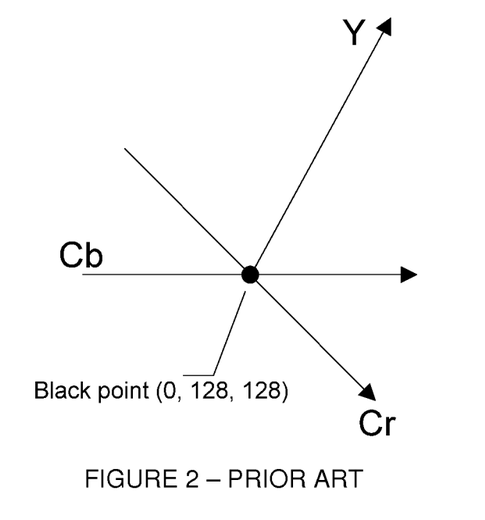
FIG. 2 represent a YCbCr difference color encoding system according to the prior art.

In a YCbCr color difference encoding system when considering an 8-bit quantized signal, the black point is the point (0, 128, 128) (luma black point with achromatic components). Thus, color space conversion requires a translation by an offset to set the origin of the black point to (0, 0, 0). Besides, video signal representation standards or recommendations do not use the full dynamic range available for YCC video signal, i.e., all the available codewords are not used (known as legal/normal/restricted range, as opposed to full range). Typically, for 8-bit video signals the black value is set to 16. The values [0;15] are often referred to as "footroom." In this case, the YCbCr black point is (16, 128, 128). This adds a supplemental translation by an offset. As illustrated by FIG. 2, an adequate color space transformation is defined by a matrix (rotation around black point) and offsets (for translating the origin to black point) to be applied before and/or after the matrix during the color space conversion. The 3×3 matrix of the CRI represents only a rotation in the color space (with an offset that can be considered as null). In addition, the 1D LUTs of the CRI cannot handle any offsets since they are defined with positive values while the offsets can be negative.

3. BRIEF SUMMARY

A method for color mapping a video signal is disclosed that comprises:
  obtaining at least one color mapping function;
  obtaining at least one offset; and
  applying the color mapping function and the at least one offset on the video signal to obtain a mapped video signal.

A device for color mapping a video signal is disclosed that comprises at least a processor configured to:
  obtain at least one color mapping function;
  obtain at least one offset; and
  apply the color mapping function and the at least one offset on the video signal to obtain a mapped video signal.

A device for color mapping a video signal is disclosed that comprises:
  means for obtaining at least one color mapping function;
  means for obtaining at least one offset; and
  means for applying the color mapping function and the at least one offset on the video signal to obtain a mapped video signal.

A processor readable medium having stored therein instructions for causing a processor to perform at least:
  obtaining at least one color mapping function;
  obtaining at least one offset; and
  applying the color mapping function and the at least one offset on the video signal to obtain a mapped video signal.

A computer program product comprising program code instructions to execute the steps of the color mapping method when this program is executed on a computer.

The following embodiments apply to the color mapping devices, the color mapping method, the processor readable medium and the computer program product.

According to a specific characteristic, the color mapping function is composed of at least a first one-dimensional mapping function, a matrix and at least a second one dimensional mapping function.

In an exemplary embodiment, obtaining at least one offset comprises obtaining a first offset and a second offset.

Advantageously, applying the color mapping function and the at least one offset on the video signal to obtain a mapped video signal comprises applying the first one dimensional mapping function, adding the first offset, applying the matrix, adding the second offset and applying the second one dimensional non-linear mapping function.

In an exemplary embodiment, obtaining at least one offset comprises determining the color encoding system of the video signal and of the mapped video signal and determining the at least one offset responsive to the determined color encoding system.

Advantageously, determining the color encoding system of the obtained video signal comprises decoding matrix_coeffs and video_full_range_flag syntax elements of the Video Usability Information and determining the color encoding system of the mapped video signal comprises decoding colour_remap_matrix_coefficients and colour_remap_full_range_flag syntax elements of the colour_remapping_info Supplemental Enhancement Information message.

In another exemplary embodiment, obtaining at least one offset comprises decoding a syntax element and determining the at least one offset responsive to the syntax element.

Advantageously, decoding the syntax element comprises decoding colour_remap_id syntax element of the colour_remapping_info Supplemental Enhancement Information message.

A method for encoding a video signal is further disclosed that comprises:
  encoding the video signal;
  encoding at least a color mapping function; and
  encoding a syntax element representative of at least one offset, wherein the color mapping function and the at least one offset are to be applied on the video signal after decoding.

A device for encoding a video signal is further disclosed that comprises at least a processor configured to:
  encode the video signal;
  encode at least a color mapping function; and
  encode a syntax element representative of at least one offset, wherein the color mapping function and the at least one offset are to be applied on the video signal after decoding.

A device for encoding a video signal is further disclosed that comprises:
  means for encoding the video signal;
  means for encoding at least a color mapping function; and
  means for encoding a syntax element representative of at least one offset, wherein the color mapping function and the at least one offset are to be applied on the video signal after decoding.

A processor readable medium having stored therein instructions for causing a processor to perform at least:
  encoding the video signal;
  encoding at least a color mapping function; and
  encoding a syntax element representative of at least one offset, wherein the color mapping function and the at least one offset are to be applied on the video signal after decoding.

A computer program product comprising program code instructions to execute the steps of the encoding method when this program is executed on a computer.

The following embodiments apply to the encoding devices, the encoding method, the processor readable medium and the computer program product.

Advantageously, encoding the syntax element comprises encoding colour_remap_id syntax element of the colour_remapping_info Supplemental Enhancement Information message.

5. DETAILED DESCRIPTION

Figure 3:
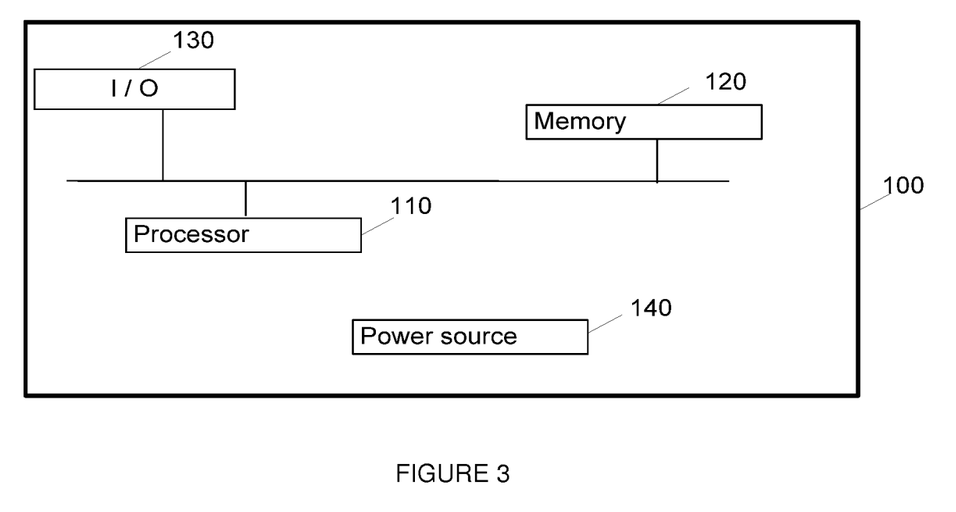
FIG. 3 represents, according to an exemplary and non-limiting embodiment, an exemplary architecture of a device configured to color map a video signal using a color mapping function.

FIG. 3 represents, according to an exemplary and non-limiting embodiment, an exemplary architecture of a device 100 configured to color map a video signal VS using a color mapping function CMF in order to obtain a mapped video signal MVS. The device 100 may be part of a decoder. The device 100 comprises one or more processor(s) 110, which could comprise, for example, a CPU, a GPU and/or a DSP (English acronym of Digital Signal Processor), along with internal memory 120 (e.g. RAM, ROM and/or EPROM). The device 100 comprises one or more Input/Output interface(s) 130, each adapted to display output information and/or allow a user to enter commands and/or data (e.g. a keyboard, a mouse, a touchpad, a webcam); and a power source 240 which may be external to the device 100. The device 100 may also comprise one or more network interface(s) (not shown). The video signal VS and/or the color mapping function CMF may be obtained from a source. In a variant, the video signal VS and/or the color mapping function CMF are/is decoded from a bitstream which is itself obtained from a source. According to different embodiments, the source belongs to a set comprising:
  a local memory, e.g. a video memory, a RAM, a flash memory, a hard disk;
  a storage interface, e.g. an interface with a mass storage, a ROM, an optical disc or a magnetic medium;
  a communication interface, e.g. a wireline interface (for example a bus interface, a wide area network interface, a local area network interface) or a wireless interface (such as a IEEE 802.11 interface or a Bluetooth interface); and
  an image capturing circuit (e.g. a sensor such as, for example, a CCD (or Charge-Coupled Device) or CMOS (or Complementary Metal-Oxide-Semiconductor)).

According to different embodiments, the mapped video signal MVS mapped is based on the color mapping function CMF and may be sent to a destination. As an example, the mapped video signal MVS is stored in a remote or in a local memory, e.g. a video memory or a RAM, a hard disk. In a variant, the mapped video signal MVS is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network. According to an exemplary and non-limiting embodiment, the device 100 further comprises a computer program stored in the memory 120. The computer program comprises instructions which, when executed by the device 100, in particular by the processor 110, enable the device 100 to execute the method described with reference to any of FIGS. 4, 6 to 10. According to a variant, the computer program is stored externally to the device 100 on a non-transitory digital data support, e.g. on an external storage medium such as a HDD, CD-ROM, DVD, a read-only and/or DVD drive and/or a DVD Read/Write drive, all known in the art. The device 100 thus comprises a mechanism to read the computer program. Further, the device 100 could access one or more Universal Serial Bus (USB)-type storage devices (e.g., "memory sticks.") through corresponding USB ports (not shown).

According to exemplary and non-limiting embodiments, the device 100 is a device, which belongs to a set comprising:
- a mobile device;
- a communication device;
- a game device;
- a set top box;
- a TV set;
- a Blu-ray Disc player;
- a tablet (or tablet computer);
- a laptop;
- a display and
- a decoding chip.

Figure 4:
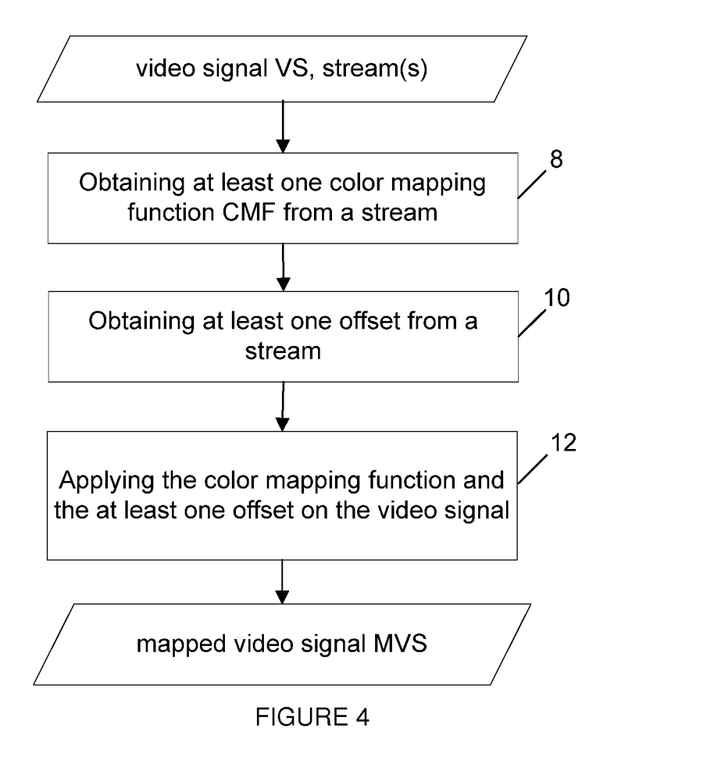
FIG. 4 represents, according to exemplary and non-limiting embodiment, a flowchart of a method for color mapping a video signal using a color mapping function.

FIG. 4 represents, according to an exemplary and non-limiting embodiment, a flowchart of a method for color mapping a video signal VS using a color mapping function CMF in order to obtain a mapped video signal MVS. The video signal VS may be obtained from a source, e.g. a memory. In a variant, the video signal VS is decoded from a bitstream F. On FIG. 4, the modules are functional units, which may or not be in relation with distinguishable physical units. For example, these modules or some of them may be brought together in a unique component or circuit, or contribute to functionalities of software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

In a step 8, at least one color mapping function CMF is obtained. The color mapping function CMF may be obtained from a source, e.g. a memory, or decoded from a stream, e.g. a metadata stream such as a CRI. The stream may be part of the bitstream F. In an exemplary embodiment, the at least one color mapping function is composed of at least a first one-dimensional mapping function, a matrix and at least a second one dimensional mapping function. In another variant, the at least one color mapping function is composed of 3 first one-dimensional mapping functions (F1, F2 and F3), one for each color component, a 3 by 3 matrix M and 3 second one-dimensional mapping functions (G1, G2 and G3) as depicted on FIG. 1.

In a step 10, at least one offset is obtained. The offset may be obtained from a source or decoded from a stream, e.g., a stream of metadata, that may be the same as the stream from which the color mapping function CMF is obtained. In a variant, two offsets O1 and O2 are obtained. An offset can be a single value or a vector of several values. As an example, the offset is a vector of 3 values, one per color component.

Figure 5:
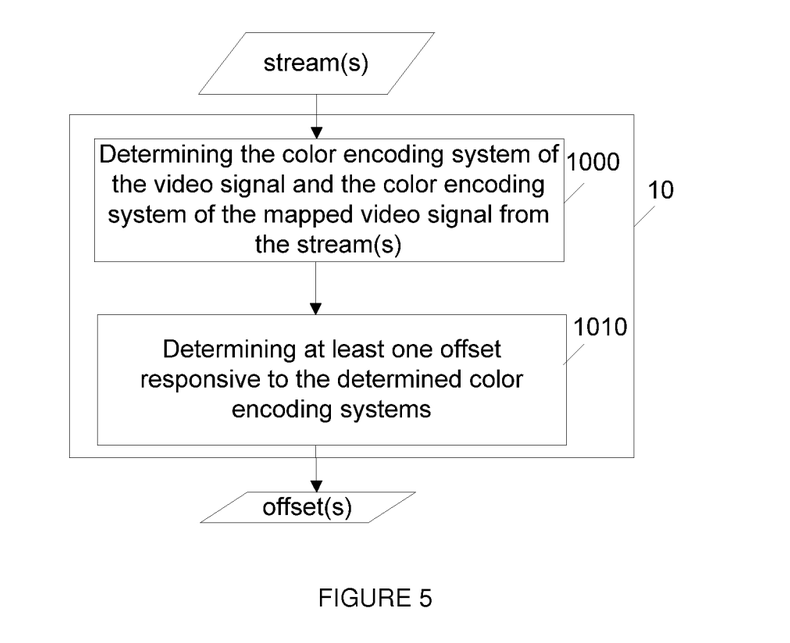
FIGS. 5-9 detail one step of the color mapping method of FIG. 4 according to exemplary and non-limiting embodiments.

In a first specific and non-limiting embodiment depicted on FIG. 5, the step 10 comprises:
- determining, in step 1000, the color encoding system of the video signal VS and the color encoding system of the mapped video signal MVS; and
- determining, in step 1010, the at least one offset responsive to the two determined color encoding systems.

Figure 6:
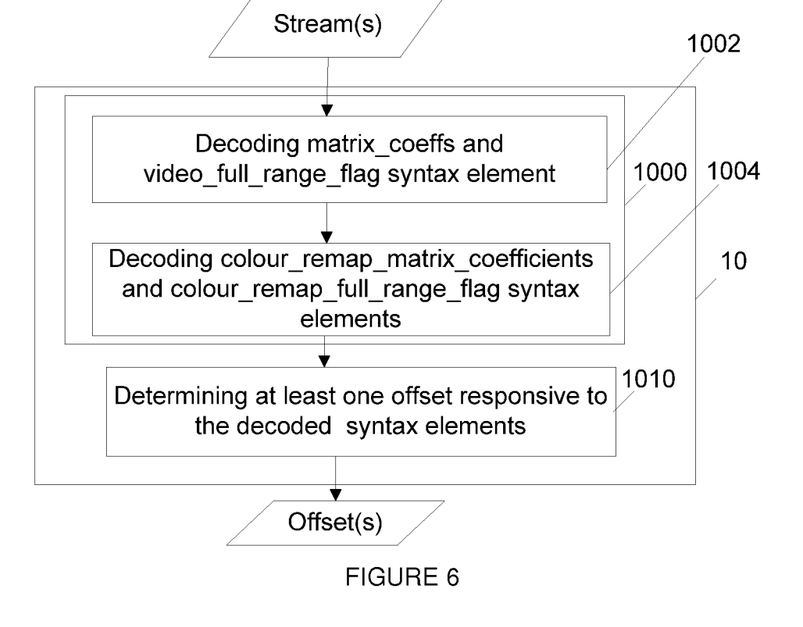

The step 1000 is detailed in FIG. 6. The color encoding system of the video signal VS (input color encoding system) is determined by decoding the following VUI syntax elements matrix_coeffs and video_full_range_flag in a step 1002. VUI stands for Video Usability Information and is defined in section E.2.1 of the document ISO/IEC 23008-2. video_full_range_flag indicates the black level and range of the luma and chroma signals as derived from $E'_Y$, $E'_{PB}$, and $E'_{PR}$ or $E'_R$, $E'_G$, and $E'_B$ real-valued component signals and matrix_coeffs describes the matrix coefficients used in deriving luma and chroma signals from the green, blue, and red, or Y, Z, and X primaries, as specified in Table 1.

TABLE 1

| | Matrix coefficients | |
|---|---|---|
| Value | Matrix | Informative remark |
| 0 | Identity | The identity matrix. |
| | | Typically used for GBR (often referred to as RGB); |
| | | however, may also be used for YZX (often referred to as |
| | | XYZ); see Equations E-19 to E-21 |
| | | IEC 61966-2-1 (sRGB) |
| | | Society of Motion Picture and Television Engineers ST |
| | | 428-1 |
| 1 | $K_R = 0.2126$; $K_B = 0.0722$ | ITU-R Rec. BT.709-5 |
| | | ITU-R Rec. BT.1361 conventional colour gamut system |
| | | and extended colour gamut system |
| | | IEC 61966-2-1 (sYCC) |
| | | IEC 61966-2-4 xvYCC$_{709}$ |
| | | Society of Motion Picture and Television Engineers RP |
| | | 177 (1993) Annex B |
| 2 | Unspecified | Image characteristics are unknown or are determined by |
| | | the application. |
| 3 | Reserved | For future use by ITU-T|ISO/IEC |
| 4 | $K_R = 0.30$; $K_B = 0.11$ | United States Federal Communications Commission Title |
| | | 47 Code of Federal Regulations (2003) 73.682 (a) (20) |

TABLE 1-continued

Matrix coefficients

| Value | Matrix | Informative remark |
|---|---|---|
| 5 | $K_R = 0.299$; $K_B = 0.114$ | ITU-R Rec. BT.470-6 System B, G (historical)<br>ITU-R Rec. BT.601-6 625<br>ITU-R Rec. BT.1358 625<br>ITU-R Rec. BT.1700 625 PAL and 625 SECAM<br>IEC 61966-2-4 xvYCC$_{601}$<br>(functionally the same as the value 6) |
| 6 | $K_R = 0.299$; $K_B = 0.114$ | ITU-R Rec. BT.601-6 525<br>ITU-R Rec. BT.1358 525<br>ITU-R Rec. BT.1700 NTSC<br>Society of Motion Picture and Television Engineers 170M (2004)<br>(functionally the same as the value 5) |
| 7 | $K_R = 0.212$; $K_B = 0.087$ | Society of Motion Picture and Television Engineers 240M (1999) |
| 8 | YCgCo | See Equations E-22 to E-36 |
| 9 | $K_R = 0.2627$; $K_B = 0.0593$ | Rec. ITU-R BT.2020 non-constant luminance system<br>See Equations E-16 to E-18 |
| 10 | $K_R = 0.2627$; $K_B = 0.0593$ | Rec. ITU-R BT.2020 constant luminance system<br>See Equations E-37 to E-46 |
| 11 . . . 255 | Reserved | For future use by ITU-T|ISO/IEC |

The color encoding system of the mapped video signal MVS (output color encoding system) is determined, in step 1004, by decoding colour_remap_matrix_coefficients and colour_remap_full_range_flag syntax elements of the CRI (Colour Remapping Information) SEI message. These syntax elements are defined in section D.3.32 of the document ISO/IEC 23008-2. colour_remap_matrix_coefficients has the same semantics as specified in clause E.3.1 of ISO/IEC 23008-2 for the matrix_coeffs syntax element, except that colour_remap_matrix_coefficients specifies the colour space of the remapped reconstructed picture, rather than the colour space used for the CLVS (English acronym of coded layer-wise video sequence). colour_remap_full_range_flag has the same semantics as specified in clause E.3.1 for the video_full_range_flag syntax element, except that colour_remap_full_range_flag specifies the colour space of the remapped reconstructed picture, rather than the colour space used for the CLVS.

In the step 1010, the at least one offset is determined responsive to the two determined color encoding systems. As an example, the offet(s) is (are) inferred using the table 2.

TABLE 2

Inferred offsets for implicit signaling

| Input color encoding system (e.g. determined from VUI) | Offsets per component before the 3 × 3 matrix | |
|---|---|---|
| YCbCr legal range<br>(e.g. matrix_coeffs = {1, 4 to 10} and video_full_range_flag = 0) | Y: −(16 << (bit_depth1-8))<br>Cb: −(128 << (bit_depth1-8))<br>Cr: −(128 << (bit_depth1-8)) | default mode (Blu-ray) |
| RGB<br>(e.g. matrix_coeffs = 0) | R: 0<br>G: 0<br>B: 0 | |
| YCbCr full range<br>(e.g. matrix_coeffs = {1, 4 to 10} and video_full_range_flag = 1) | Y: 0<br>Cb: −(128 << (bit_depth1-8))<br>Cr: −(128 << (bit_depth1-8)) | |
| matrix_coeffs = 2 | Defined by the application | |
| matrix_coeffs = 3 | Undetermined | |
| Output color encoding system (e.g. determined from CRI SEI) | Offset per component after the 3 × 3 matrix | |
| YCbCr legal range<br>(e.g.<br>colour_remap_matrix_coefficients = {1, 4-10} and<br>colour_remap_full_range_flag = 0) | Y: (16 << (bit_depth2-8))<br>Cb: (128 << (bit_depth2-8))<br>Cr: (128 << (bit_depth2-8)) | default mode (Blu-ray) |
| RGB<br>(e.g.<br>colour_remap_matrix_coefficients = 0) | R: 0<br>G: 0<br>B: 0 | |
| YCbCr full range<br>(e.g.<br>colour_remap_matrix_coefficients = {1, 4-10} and<br>colour_remap_full_range_flag = 1) | Y: 0<br>Cb: (128 << (bit_depth2-8))<br>Cr: (128 << (bit_depth2-8)) | |
| matrix_coeffs = 2 | Defined by the application | |
| matrix_coeffs = 3 | Undetermined | | bit_depth1 is equal to colour_remap_bit_depth or colour_remap_input_bit_depth (implementation choice).
bit_depth2 is equal to colour_remap_bit_depth or colour_remap_input_bit_depth (implementation choice).

Input and output color encoding systems may be different. Input color encoding system acts on the offset value applied before the matrix M. Output color encoding system acts on the offset value applied after the matrix M. colour_remap_bit_depth as defined in section D.3.32 of ISO/IEC 23008-2:2015 specifies the bit depth of the output of the colour remapping function described by the colour remapping information SEI message. colour_remap_input_bit_depth as defined in section D.3.32 of ISO/IEC 23008-2:2015 specifies the bit depth of the luma and chroma components or the RGB components of the associated pictures for purposes of interpretation of the colour remapping information SEI message.

Figure 7:
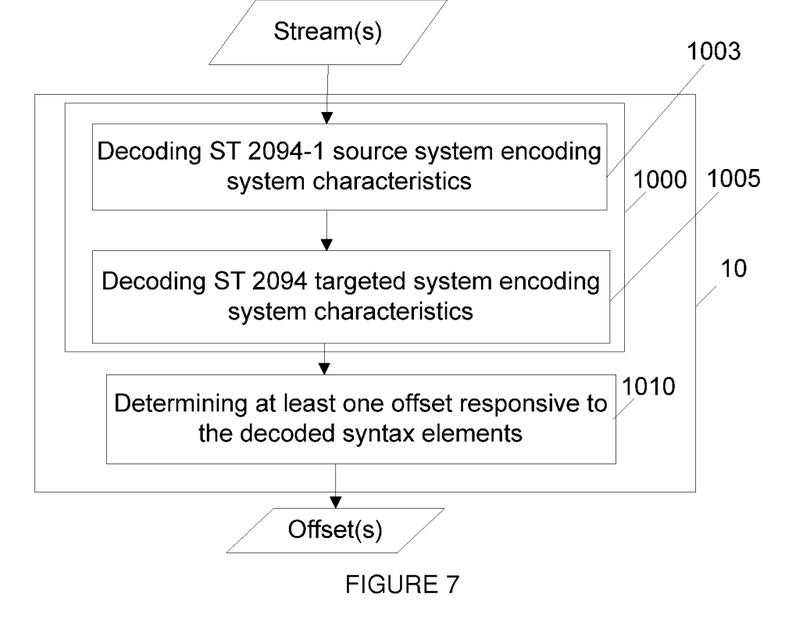

In a variant of FIG. 6 depicted in FIG. 7, the color encoding system of the video signal VS is determined, in step 1003, by decoding the source color encoding system characteristics as defined by the SMPTE recommendation ST 2094-1 and the color encoding system of the mapped video signal MVS is determined, in step 1005, by decoding the targeted color encoding system characteristics as defined by the SMPTE recommendation ST 2094-1.

Figure 8:
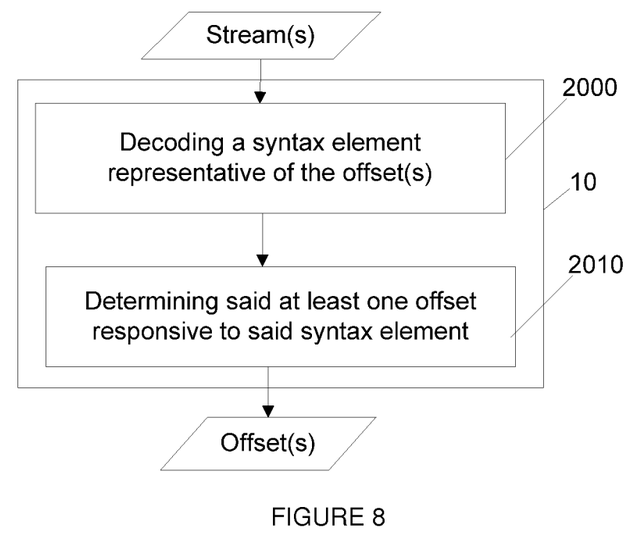

In a second specific and non-limiting embodiment depicted in FIG. 8, the step 10 comprises:
- decoding, in step 2000, a syntax element from a stream representative of the at least one offset; and
- determining, in step 2010, the at least one offset responsive to the decoded syntax element.

Figure 9:
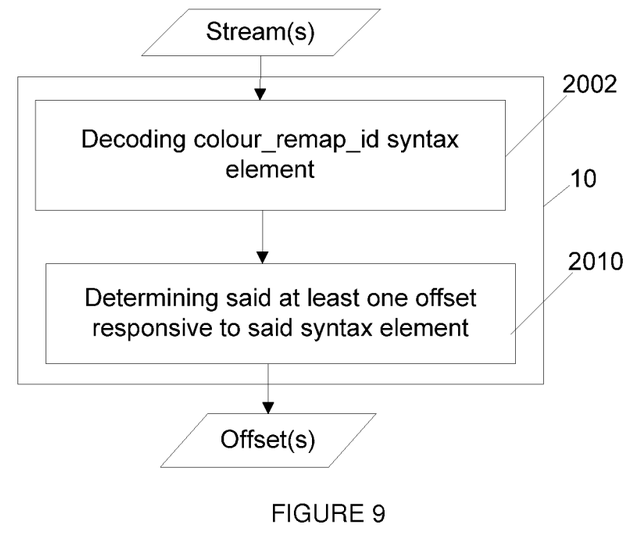
Figure 10:
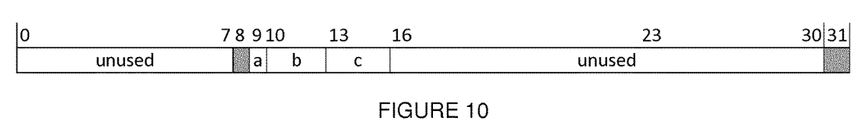
FIG. 10 represents a colour_remap_id element decoded as a 32 bit value.

As an example depicted in FIG. 9, the syntax element is the colour_remap_id syntax element of the CRI SEI message. Specifically, the offsets may be inferred from the CRI SEI message syntax element colour_remap_id. Indeed, the semantic of this syntax element is a placeholder for further definition. colour_remap_id contains an identifying number that may be used to identify the purpose of the colour remapping information.

colour_remap_id (coded as an unsigned exponential Golomb) is decoded as a 32 bit value that can be seen as a concatenation of several fields as depicted in FIG. 10. Grey values are reserved bits on this figure. Bits 9 to 15 are used to code the offsets. Value 'a' uses bit 9, value 'b' uses bits 10-12, value 'c' uses bits 13-15. The tables 3 and 4 below define the offsets according to the signalling.

TABLE 3 signaled offsets before the 3 × 3 matrix (O1)

| a | b | c | Offset per component before the 3 × 3 matrix |
|---|---|---|---|
| 0 | XXX | XXX | Implicit - Inferred from color encoding system of input values (see Table) |
| 1 | 0 | XXX | −16 << (bit_depth1-8)<br>−128 << (bit_depth1-8)<br>−128 << (bit_depth1-8) |
| 1 | 1 | XXX | 0<br>−128 << (bit_depth1-8)<br>−128 << (bit_depth1-8) |
| 1 | 2 | XXX | 16 << (bit_depth2-8)<br>−128 << (bit_depth2-8)<br>−128 << (bit_depth2-8) |
| 1 | 3 | XXX | 0<br>−128 << (bit_depth2-8)<br>−128 << (bit_depth2-8) |
| 1 | 4 | XXX | 0<br>0<br>0 |
| 1 | others | XXX | undetermined |

TABLE 4 signaled offsets after the 3 × 3 matrix (O2)

| a | b | c | Offset per component after the 3 × 3 matrix |
|---|---|---|---|
| 0 | XXX | XXX | Implicit - Inferred from color encoding system of input values (see Table) |
| 1 | XXX | 0 | −16 << (bit_depth 1-8)<br>−128 << (bit_depth1-8)<br>−128 << (bit_depth1-8) |
| 1 | XXX | 1 | 0<br>−128 << (bit_depth1-8)<br>−128 << (bit_depth1-8) |
| 1 | XXX | 2 | −16 << (bit_depth2-8)<br>−128 << (bit_depth2-8)<br>−128 << (bit_depth2-8) |
| 1 | XXX | 3 | 0<br>−128 << (bit_depth2-8)<br>−128 << (bit_depth2-8) |
| 1 | XXX | 4 | 0<br>0<br>0 |
| 1 | XXX | others | undetermined | bit_depth1 is set equal to colour_remap_input_bit_depth and bit_depth2 is set equal to colour_remap_bit_depth.

In a variant, a single table may be used instead of tables (table 3 and 4). The colour_remap_id is defined as a list of values with each value mapping to an offset pair. Examples are defined in table 5,

TABLE 5 signaled offsets before and after the 3 × 3 matrix (O1)

| Value | Offset per component before the 3 × 3 matrix | XOffset per component after the 3 × 3 matrix |
|---|---|---|
| 0 | Implicit - Inferred from color encoding system of input values (see Table 2) | |
| 1 | −16 << (bit_depth1-8)<br>−128 << (bit_depth1-8)<br>−128 << (bit_depth1-8) | −16 << (bit_depth1-8)<br>−128 << (bit_depth1-8)<br>−128 << (bit_depth1-8) |
| 2 | 0<br>−128 << (bit_depth1-8)<br>−128 << (bit_depth1-8) | −16 << (bit_depth1-8)<br>−128 << (bit_depth1-8)<br>−128 << (bit_depth1-8) |
| 3 | −16 << (bit_depth2-8)<br>−128 << (bit_depth2-8)<br>−128 << (bit_depth2-8) | 0<br>−128 << (bit_depth1-8)<br>−128 << (bit_depth1-8) |
| 4 | 0<br>−128 << (bit_depth2-8)<br>−128 << (bit_depth2-8) | 0<br>−128 << (bit_depth1-8)<br>−128 << (bit_depth1-8) |
| ... | | |

Figure 11:
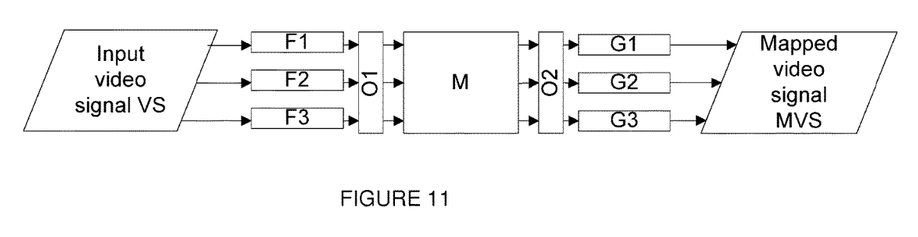
FIG. 11 illustrates the color mapping of a video signal VS into a mapped video signal MVS according to an exemplary embodiment.

Back to FIG. 4, in step 12, the color mapping function CMF and the at least one offset are applied on the video signal VS to obtain a mapped video signal MVS. As an example, applying the color mapping function CMF and the at least one offset on the video signal VS to obtain a mapped video signal MVS comprises applying a first one-dimensional mapping function, adding the first offset O1, applying the matrix M, adding the second offset O2 and applying the second one dimensional non-linear mapping function. In an illustrative embodiment depicted in FIG. 11, 3 one-dimensional mapping functions F1, F2 and F3 are applied, one on each color component of the video signal. In ISO/IEC 23008-2:2015, the 3 one-dimensional mapping functions F1, F2 and F3 are specified by the "pre_lut" set of syntax elements. Then the first offset O1 is added before applying the 3×3 matrix M. In such a case the offset O1 is a vector of 3 values, each corresponding to a color component of the video signal. Then, the 3×3 matrix is applied. The second offset O2 is added after applying of the 3×3 matrix. In such a case the offset O2 is a vector of 3 values, each corresponding to a color component of the video signal. Finally, 3 one-dimensional mapping functions G1, G2 and G3 are applied, one on each color component of the video signal after addition of the second offset O2. In ISO/IEC 23008-2:2015, the 3 one-dimensional mapping functions G1, G2 and G3 are specified by the "post_lut" set of syntax elements.

The present principles improve the color mapping performance thanks to the offsets, i.e. the look of the color remapped picture is closer from the original material.

Figure 12:
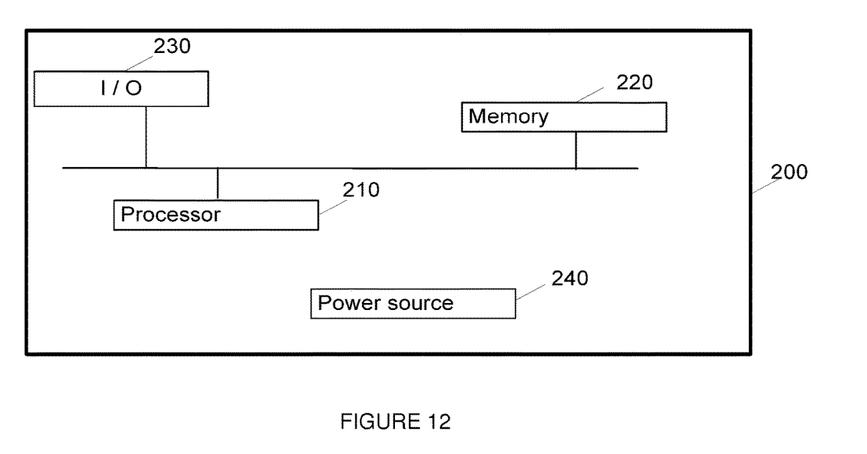
FIG. 12 represents, according to an exemplary and non-limiting embodiment, an exemplary architecture of an encoding device configured to encode a video signal and color mapping data.

FIG. 12 represents, according to an exemplary and non-limiting embodiment, an exemplary architecture of an encoding device 200 configured to encode a video signal VS and color mapping data, i.e. at least a color mapping function, into a bitstream. The color mapping data may be encoded in the same stream as the video signal or in another one. The encoding device 200 comprises one or more processor(s) 210, which could comprise, for example, a CPU, a GPU and/or a DSP (English acronym of Digital Signal Processor), along with internal memory 220 (e.g. RAM, ROM and/or EPROM). The encoding device 200 comprises one or more Input/Output interface(s) 230, each adapted to display output information and/or allow a user to enter commands and/or data (e.g. a keyboard, a mouse, a touchpad, a webcam); and a power source 240 which may be external to the encoding device 200. The device 200 may also comprise one or more network interface(s) (not shown). The video signal and the color mapping data may be obtained from a source, not necessarily the same. According to different embodiments, the source belongs to a set comprising:

- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the bitstream may be sent to a destination. As an example, the bitstream is stored in a remote or in a local memory, e.g. a video memory or a RAM, a hard disk. In a variant, the bitstream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network. According to an exemplary and non-limiting embodiment, the encoding device 200 further comprises a computer program stored in the memory 220. The computer program comprises instructions which, when executed by the encoding device 200, in particular by the processor 210, enable the encoding device 200 to execute the method described with reference to FIG. 13. According to a variant, the computer program is stored externally to the encoding device 200 on a non-transitory digital data support, e.g. on an external storage medium such as a HDD, CD-ROM, DVD, a read-only and/or DVD drive and/or a DVD Read/Write drive, all known in the art. The encoding device 200 thus comprises a mechanism to read the computer program. Further, the encoding device 200 could access one or more Universal Serial Bus (USB)-type storage devices (e.g., "memory sticks.") through corresponding USB ports (not shown).

According to exemplary and non-limiting embodiments, the encoding device 100 is a device, which belongs to a set comprising:

- a mobile device;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

Figure 13:
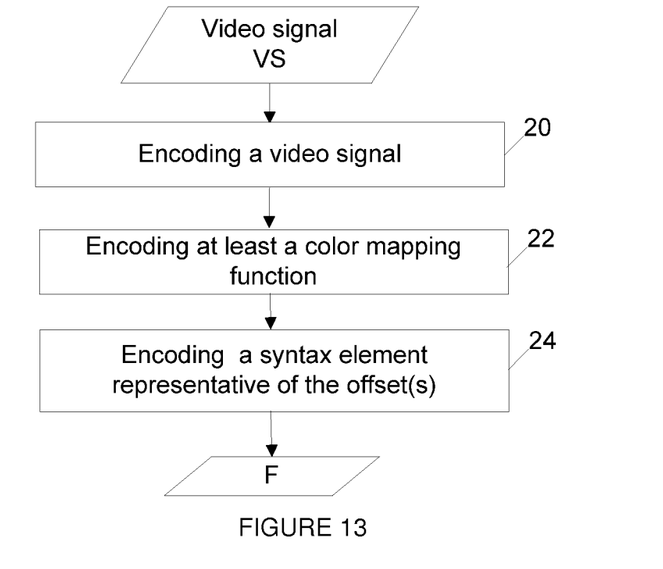
FIG. 13 represents a flowchart of a method for encoding a video signal and color mapping metadata according to an exemplary and non-limiting embodiment.

FIG. 13 represents a flowchart of a method for encoding a video signal and color mapping data, i.e at least a color mapping function, according to an exemplary and non-limiting embodiment. On FIG. 13, the modules are functional units, which may or not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

In a step 20, the video signal is coded in a bitstream F. The video signal is for example represented in a YCC color difference encoding system, e.g. in the ITU-R BT.2020 YCbCr encoding system. In an exemplary and non-limiting embodiment, coding the video signal comprises, for a block of an image of the video, determining a prediction of the block. Determining the prediction, particularly in the case of inter prediction, comprises determining motion vectors with respect to reconstructed blocks taken as references. The prediction is then determined from the motion vectors and the reference reconstructed blocks. The prediction is subtracted from the block to be coded in order to obtain a residual and the residual is encoded. Classically, encoding the residual comprises applying a transformation T (e.g. a DCT) to the residual in order to produce coefficients, which are in turn quantized and entropy coded. The block may then be reconstructed in order to produce a reconstructed block. To this aim, the quantized coefficients are dequantized and an inverse transform $T^{-1}$ is applied to the dequantized coefficients. The prediction is then added to the result of the inverse transform $T^{-1}$ in order to produce a reconstructed block. The reconstructed block may serve as reference when coding other blocks. Exemplarily, the video signal may be encoded using H.264 or H.265 compliant encoding methods. It will be appreciated, however, that the invention is not restricted to this specific encoding method.

In a step 22, color mapping data, specifically at least a mapping function, to be applied on the video signal after its decoding are coded, for example in the bitstream F or in another stream different from F. Exemplarily, the color mapping data are encoded as specified in section D.3.32 of the standard document ISO/IEC 23008-2, i.e. the color mapping data are encoded in a colour_remapping_info SEI message.

In a step 24, a syntax element representative of the offset(s) is (are) encoded, for example in the bitstream F. The syntax element is for example encoded using the "colour_remap_id" syntax element as disclosed for the color mapping method with respect to FIGS. 8 to 10. All the variant disclosed with respect to FIGS. 8 to 10 apply to the encoding method and device.

The implementations described herein may be implemented in, for example, a method or a process, an apparatus, a software program, a data stream, or a signal. Even if only discussed in the context of a single form of implementation (for example, discussed only as a method or a device), the implementation of features discussed may also be implemented in other forms (for example a program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A method for color mapping a video signal, comprising:
determining a color encoding system of the video signal;
determining at least one offset for each color component, responsive to a black point of the color encoding system of the video signal and a bit depth of the video signal; and
mapping the video signal responsive to at least one color mapping function to form a mapped video signal, wherein the at least one color mapping function includes a first one-dimensional mapping function defined per color component, a second one-dimensional mapping function defined per color component, and a 3×3 matrix, the mapping comprising:
applying the first one-dimensional mapping function before applying the 3×3 matrix, and
applying the second one-dimensional mapping function after applying the 3×3 matrix, wherein the at least one offset is applied in at least one of (1) between the first one-dimensional mapping function and the 3×3 matrix, and (2) between the 3×3 matrix and the second one-dimensional mapping function.

2. The method according to claim 1, wherein the color encoding system of the video signal is defined by a type of color components of video signal and a range of the color components.

3. The method according to claim 2, wherein the type of color components belongs to a set of types of color components comprising RGB and YCbCr.

4. The method of claim 2, wherein the range of the color components belongs to a set of ranges comprising full range and legal range.

5. The method according to claim 1, wherein the color encoding system of the video signal is determined responsive to matrix coefficients used in deriving luma and chroma signals of said video signal and a black level and a range of the luma and chroma signals of said video signal.

6. The method according to claim 1, wherein the color encoding system of the mapped video signal is determined responsive to matrix coefficients used in deriving luma and chroma signals of said mapped video signal and a black level and a range of the luma and chroma signals of said mapped video signal.

7. A device for color mapping a video signal comprising at least a processor configured to:
determine a color encoding system of the video signal;
determine at least one offset responsive to a black point of the color encoding system of the video signal and a bit depth of the video signal; and
map the video signal responsive to at least one color mapping function to form a mapped video signal, wherein the at least one color mapping function includes a first one-dimensional mapping function defined per color component, a second one-dimensional mapping function defined per color component, and a 3×3 matrix, wherein the at least a processor is configured to perform the mapping by:

applying the first one-dimensional mapping function before applying the 3×3 matrix, and applying the second one-dimensional mapping function after applying the 3×3 matrix, wherein the at least one offset is applied in at least one of (1) between the first one-dimensional mapping function and the 3×3 matrix, and (2) between the 3×3 matrix and the second one-dimensional mapping function.

8. The device according to claim 7, wherein the color encoding system of the video signal is defined by a type of color components of video signal and a range of the color components.

9. The device according to claim 8, wherein the type of color components belongs to a set of types of color components comprising RGB and YCbCr.

10. The device of claim 8, wherein the range of the color components belongs to a set of ranges comprising full range and legal range.

11. The device according to claim 7, wherein the color encoding system of the video signal is determined responsive to matrix coefficients used in deriving luma and chroma signals of said video signal and a black level and a range of the luma and chroma signals of said video signal.

12. The device according to claim 7, wherein the color encoding system of the mapped video signal is determined responsive to matrix coefficients used in deriving luma and chroma signals of said mapped video signal and a black level and a range of the luma and chroma signals of said mapped video signal.

13. The method according to claim 1, further comprising:
determining a color encoding system of the mapped video signal; and
determining the at least one offset for each color component, further responsive to a black point of the color encoding system of the mapped video signal and a bit depth of the mapped video signal.

14. The device according to claim 7, wherein the processor is further configured to:
determine a color encoding system of the mapped video signal; and
determine the at least one offset for each color component, further responsive to a black point of the color encoding system of the mapped video signal and a bit depth of the mapped video signal.

* * * * *